United States Patent
Lin et al.

(10) Patent No.: US 9,223,358 B2
(45) Date of Patent: Dec. 29, 2015

(54) FOLDABLE ASSEMBLY AND PIVOT ASSEMBLY THEREOF

(71) Applicants: Inventec (Pudong) Technology Corporation, Shanghai (CN); INVENTEC CORPORATION, Taipei (TW)

(72) Inventors: Yen-Cheng Lin, Taipei (TW); Hsin-Liang Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 190 days.

(21) Appl. No.: 14/175,691

(22) Filed: Feb. 7, 2014

(65) Prior Publication Data

US 2015/0098195 A1    Apr. 9, 2015

(30) Foreign Application Priority Data

Oct. 9, 2013    (CN) .......................... 2013 1 0467223

(51) Int. Cl.
  *H05K 5/00*    (2006.01)
  *G06F 1/18*    (2006.01)
(52) U.S. Cl.
  CPC .................... *G06F 1/185* (2013.01)

(58) Field of Classification Search
  USPC ................. 361/728–730, 755, 792; 439/325; 455/575.1–575.4, 575.7
  See application file for complete search history.

(56) References Cited

U.S. PATENT DOCUMENTS

| | | | | |
|---|---|---|---|---|
| 1,466,859 | A * | 9/1923 | Sutton | 211/99 |
| 8,047,351 | B2 * | 11/2011 | Chapman et al. | 192/111.15 |
| 8,995,143 | B2 * | 3/2015 | Lin | 361/755 |
| 9,110,640 | B2 * | 8/2015 | Lin | |
| 2006/0183564 | A1 * | 8/2006 | Park | 473/245 |
| 2009/0080164 | A1 * | 3/2009 | Purcell et al. | 361/737 |

* cited by examiner

*Primary Examiner* — Hung S Bui
(74) *Attorney, Agent, or Firm* — Locke Lord LLP; Tim Tingkang Xia, Esq.

(57) ABSTRACT

A foldable assembly includes a first plate component, a second plate component and a pivot assembly. The pivot assembly comprises a first pivot member, a second pivot member and a third pivot member. The first pivot member and the second pivot member are connected with the first plate component and the second plate component, respectively. Each of the first pivot member and the second pivot member has an axial hole and a plurality of recesses. Each of the two opposite sides of the third pivot member has a shaft and a protrusion located on an outer wall surface of the shaft. The two shafts are adapted for being rotatable on the two axial holes, respectively. The two protrusions are located on one of the plurality of recesses of the first pivot member and on the one of the plurality of recesses of the second pivot member, respectively.

10 Claims, 9 Drawing Sheets

FOLDABLE ASSEMBLY AND PIVOT ASSEMBLY THEREOF

CROSS-REFERENCE TO RELATED APPLICATIONS

This non-provisional application claims priority under 35 U.S.C. §119(a) on Patent Application No(s). 201310467223.4 filed in China on Oct. 9, 2013, the entire contents of which are hereby incorporated by reference.

TECHNICAL FIELD

The disclosure relates to a foldable assembly and a pivot assembly thereof, more particularly to a foldable assembly and its pivot assembly having a clockwise and a different counterclockwise rotational resistances.

BACKGROUND

Data processed by a Central Processing Unit (CPU) of a computer are temporarily stored in a Random Access Memory (RAM). Both of the calculation result and program are saved in the RAM. Therefore, the data storing inside the RAM is captured by the CPU when the program is going to be executed.

However, the processing speed and the quantity of the processed data have been increased to comply with the multifunctions of the computers. Therefore, users seek to increase the number of memory module slots for expanding the capacity of the memory modules. A memory foldable assembly with a plurality of expansion slots is disposed on the memory module slots of the motherboard in related art for increasing the number of memory modules of the computer. The memory module slots are much more tightly arranged to increase the number of the memory module slots in a certain limited area. The memory foldable assembly generally comprises two expansion plates and two pivot assemblies. The two expansion plates are pivoted at a closed position or at an open position by the two pivot assemblies. The memory modules on two expansion plates are interfered with each other due to the tight arrangement when the memory foldable assembly is located at a closed position or at an open position, therefore, assembling the memory modules is an inconvenient work for assembling personnel.

SUMMARY

An embodiment of the disclosure provides a foldable assembly comprising a first plate component, a second plate component and a pivot assembly. The pivot assembly comprises a first pivot member, a second pivot member and a third pivot member. The first pivot member is connected with the first plate component, and the second pivot member is connected with the second plate component. Each of the first pivot member and the second pivot member has an axial hole and a plurality of recesses which are located on an inner wall surface of the axial hole. Each of the plurality of recesses has a first surface and a second surface which is opposite to the first surface. An angle between the first surface and the inner wall surface is different from that between the second surface and the inner wall surface. Each of the two opposite sides of the third pivot member has a shaft and a protrusion located on an outer wall surface of the shaft. The two shafts are adapted for being rotatable on the two axial holes, respectively. The two protrusions are located on one of the plurality of recesses of the first pivot member and on the one of the plurality of recesses of the second pivot member, respectively.

An embodiment of the disclosure provides a pivot assembly comprising a fourth pivot member and a fifth pivot member. The fourth pivot member has a shaft and a protrusion. The shaft has an outer wall surface and the protrusion is located on the outer wall surface. The fifth pivot member has an axial hole and a plurality of recesses located on an inner wall surface of the axial hole. Each of the plurality of recesses has a first surface and a second surface. The first surface and the second surface are alternatively arranged along a rotation direction where a rotation axis is based on the axis of the axial hole. The angle between the first surface and the inner wall surface is different from that between the second surface and the inner wall surface. Each of the two opposite sides of the fourth pivot member has a shaft. The shafts are pivoted on the axial holes, respectively. The protrusion is located on one of the plurality of recesses of the fifth pivot member.

BRIEF DESCRIPTION OF THE DRAWING

The disclosure will become more fully understood from the detailed description given herein below and the drawing are for illustration only, and thus does not limit the present disclosure, wherein.

DETAILED DESCRIPTION

Figure 1:
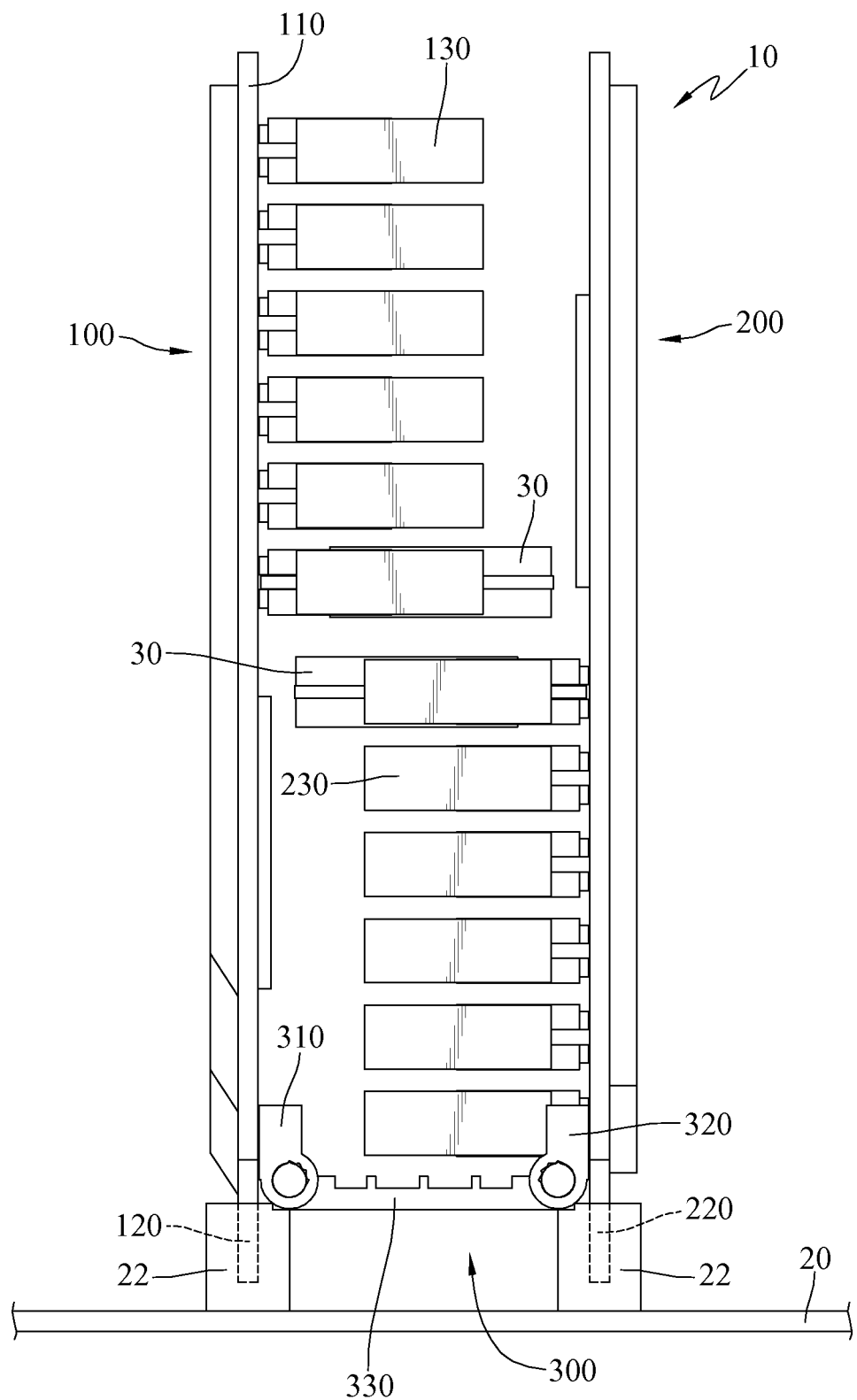
FIG. 1 is a plane view of a foldable assembly according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
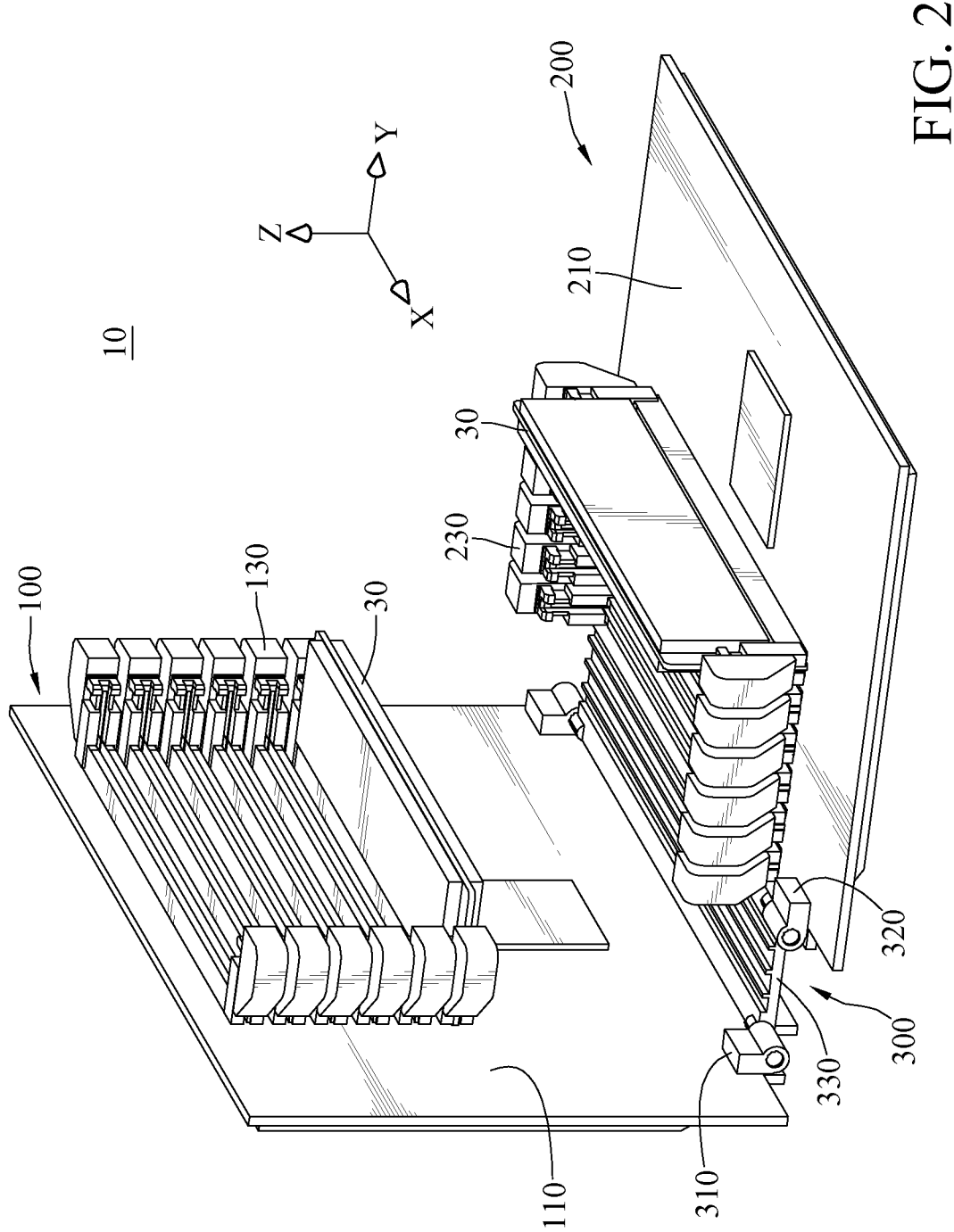
FIG. 2 is a view of the foldable assembly in FIG. 1 which is expanded.
Figure 3A:
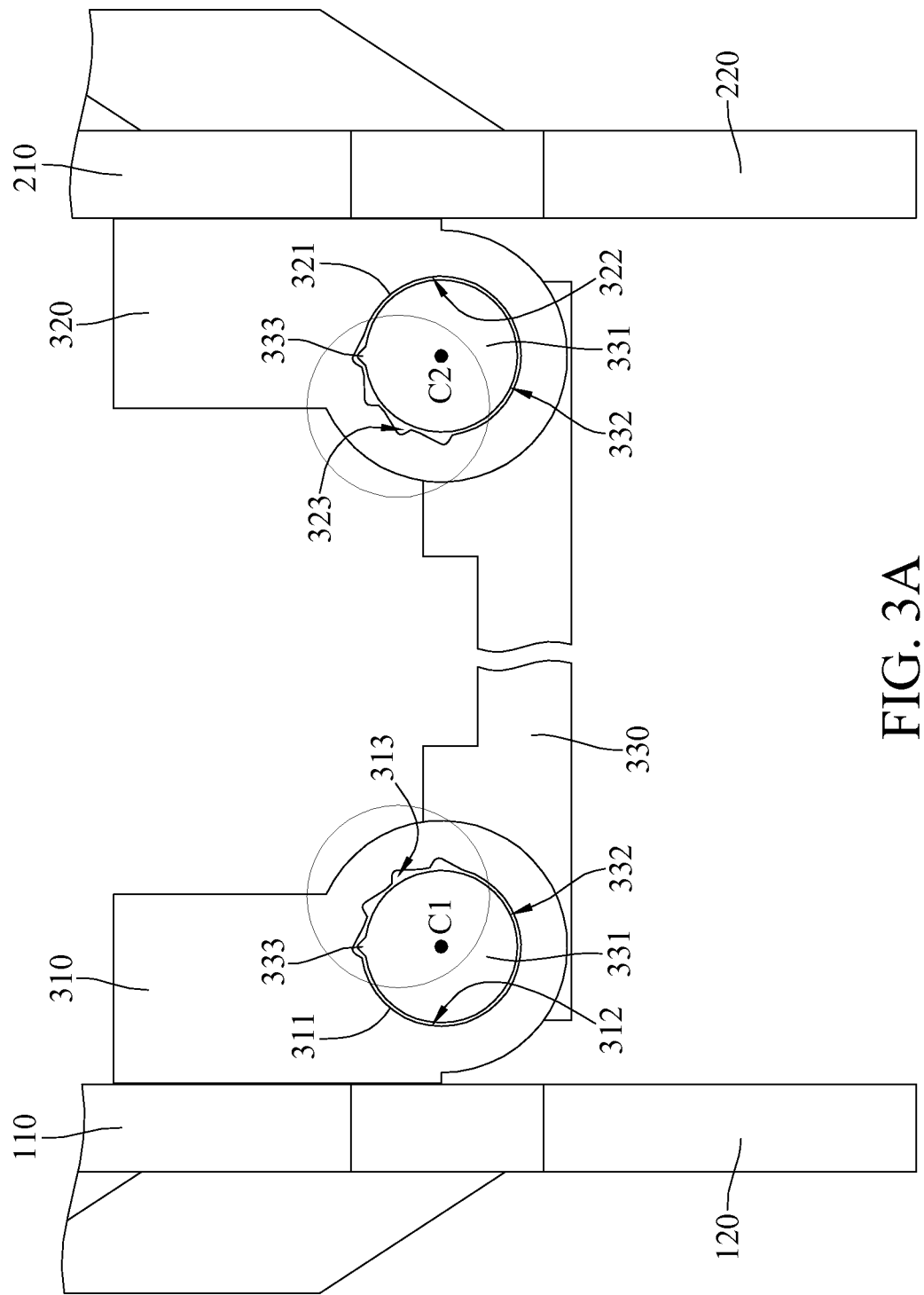
FIG. 3A is a partially enlarged plane view described in FIG. 1.
Figure 3B:
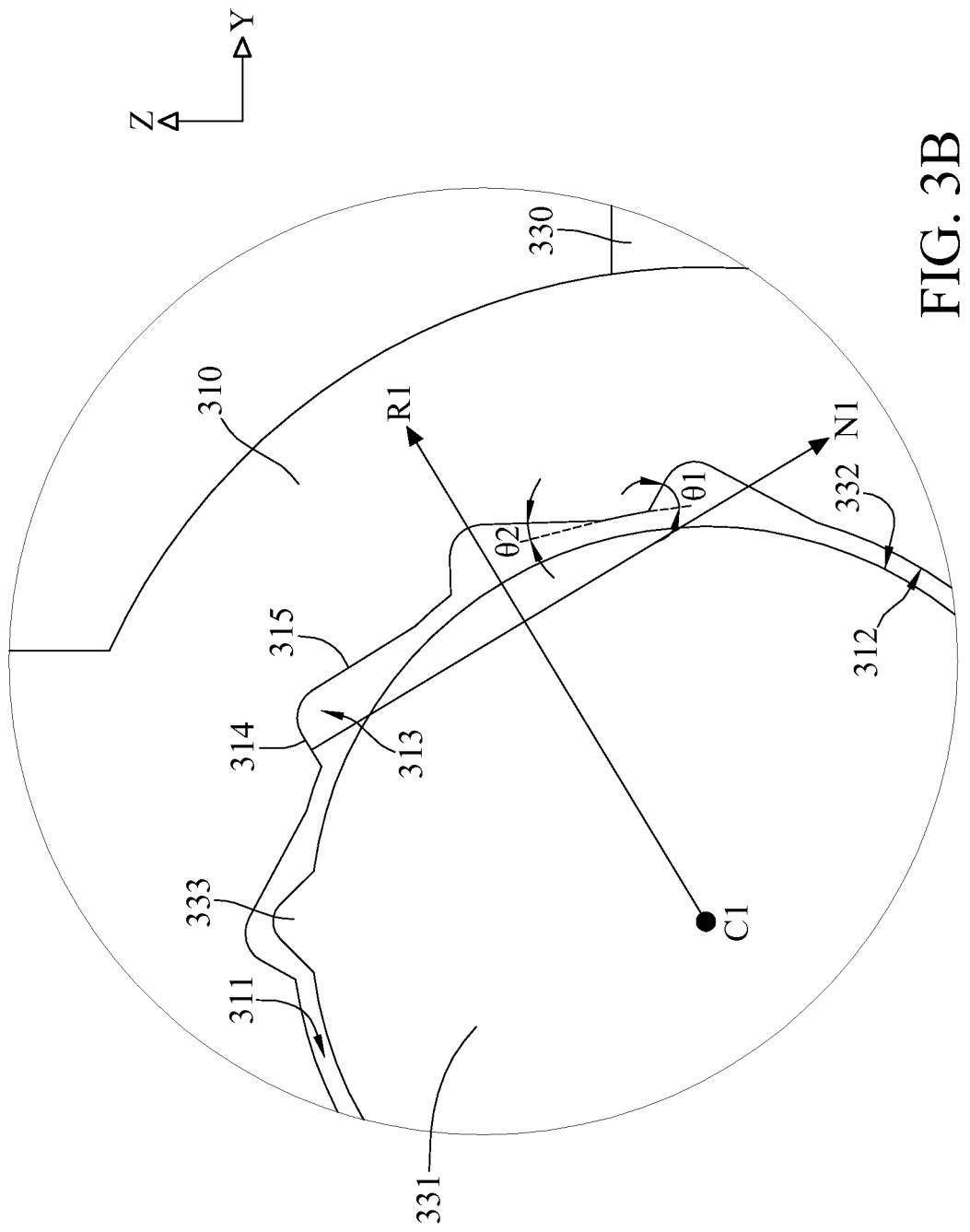
FIG. 3B is a partially enlarged plane view described in FIG. 3A.
Figure 3C:
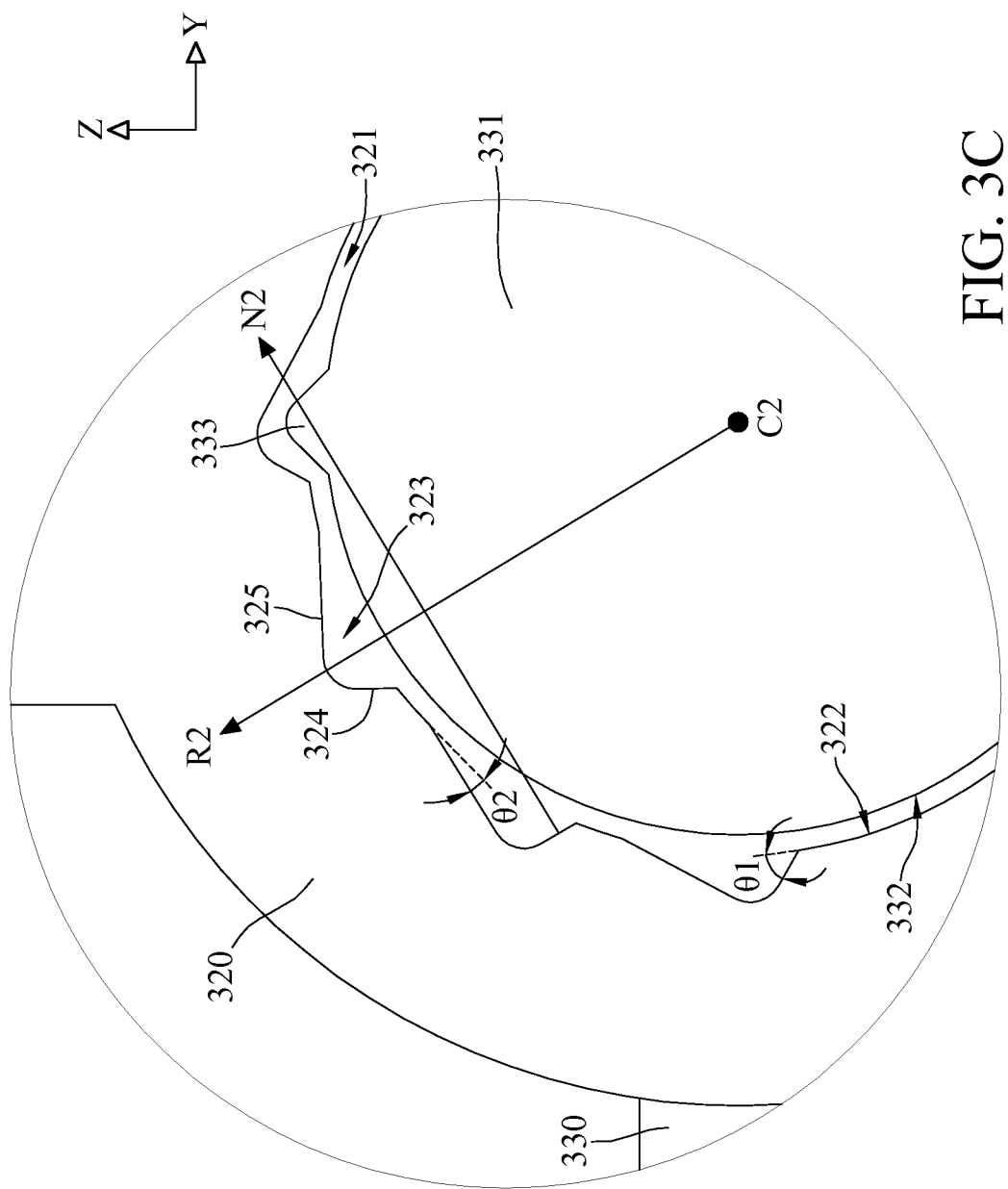
FIG. 3C is a partially enlarged plane view described in FIG. 3A.

Please refer to the FIG. 1, FIG. 2, FIG. 3A, FIG. 3B and FIG. 3C. FIG. 1 is a plane view of a foldable assembly according to an embodiment of the disclosure. FIG. 2 is an expanded view of the foldable assembly described in FIG. 1. FIG. 3A is a partially enlarged plane view described in FIG. 1. FIG. 3B is a partially enlarged plane view described in FIG. 3A. FIG. 3C is a partially enlarged plane view described in FIG. 3A.

As shown in FIG. 1, a foldable assembly is inserted into an electrical slot 22 on a substrate 20. The foldable assembly 10 comprises a first plate component 100, a second plate component 200 and a pivot assembly 300.

As shown in FIG. 2, the first plate component 100 has a first printed circuit board 110, a first electrical connection part 120 and at least one first expansion slot 130. The first electrical connection part 120 is electrically connected with the first printed circuit board 110 and the at least one first expansion slot 130 is electrically connected with the first printed circuit board 110.

The second plate component 200 has a second printed circuit board 210, a second electrical connection part 220 and at least one second expansion slot 230. The second electrical connection part 220 is electrically connected with the second printed circuit board 210. The at least one second expansion slot 230 is electrically connected with the second printed circuit board 210. The first electrical connection part 120 and the second electrical connection part 220 are coupled with two electrical slots 22, respectively. A plurality of memory modules 30 are electrically connected with the first expansion slot 130 and the second expansion slot 230, respectively.

The first plate component 100 and the second plate component 200 are pivoted with each other by the pivot assembly 300, and have a closed position and an open position together when the first plate component 100 is drawn near the second plate component 200. The at least one first expansion slot 130 and the at least one second expansion slot 230 are alternatively arranged with each other when the first plate component 100 and the second plate component 200 are located at the closed position. In this embodiment, a group of first expansion slots 130 and a group of second expansion slots 230 are connected with the first printed circuit board 110 and the second printed circuit board 210, respectively. In other embodiments, one of the first expansion slots 130 is located between the two second expansion slots 230, or one of the second expansion slots 230 is located between the two first expansion slots 130. Specifically, in this embodiment, the distance between the first expansion slot 130 and the pivot assembly 300 is greater than the second expansion slot 230 and the pivot assembly 300.

As shown in FIG. 3A and FIG. 3B, the pivot assembly 300 comprises a first pivot member 310, a second pivot member 320 and a third pivot member 330. The first pivot member 310 is connected with the first printed circuit board 110, and the second pivot member 320 is connected with the second printed circuit board 210. The first pivot member 310 has an axial hole 311 and a plurality of recesses 313 which is located on an inner wall surface 312 of the axial hole 311. The second pivot member 320 has an axial hole 321 and a plurality of recesses 323 which is located on an inner wall 322 of the axial hole 321. Each of the plurality of recesses 313, 323 has a first surface 314, 324 and a second surface 315, 325. The second surfaces 315, 325 are opposite to the first surface 313, 323. The first surface 314 of the each of the plurality of recesses 313 in the first pivot member 310 has a first normal direction N1, and the axial hole 311 has a plurality of first radial directions R1 which are far from the axis C1 of the axial hole 311. The vector product generated by the first radial direction R1 and the first normal direction N1 is defined as a first direction. (namely, the first direction faces toward the direction of negative X-axis)

As shown in FIG. 3A and FIG. 3C, the first surface 324 of the each of the plurality of recesses 323 in the second pivot member 320 has a second normal direction N2, and the axial hole 321 has a plurality of second radial directions R2 which are far from the axis C2 of the axial hole 321. The vector product generated by the second radial direction R2 intersected with the second normal direction N2 and the second normal direction N2 is defined as a second direction. (namely, the second direction faces toward the direction of negative X-axis.). The first direction is equal to the second direction. In other words, each first surface 314 and 324 and each second surface 315 and 324 of the recesses 313 and 323 of the first pivot member 310 and the second pivot member 320 are alternatively located along a rotational direction.

Moreover, an angle $\theta_1$ between the first surface 314 and the inner wall surface 312 is different from an angle $\theta_2$ between the second surface 315 and the inner wall surface 312. An angle $\theta_1$ between the first surface 324 and the inner wall surface 322 is different from an angle $\theta_2$ between the second surface 325 and the inner wall surface 322.

Specifically, a first angle $\theta_1$ is formed between the first surface 314 and the inner wall surface 312. A first angle $\theta_1$ is formed between the first surface 324 and the inner wall surface 322. A second angle $\theta_2$ is formed between the second surface 315 and the inner wall surface 312. A second angle $\theta_2$ is formed between the second surface 325 and the inner wall surface 322. In this embodiment, both of the first angle $\theta_1$ and the second angle $\theta_2$ are smaller than 90 degrees, and the first angle $\theta_1$ is greater than the second angle $\theta_2$.

In addition, in this embodiment of the disclosure, the first surface 314,324 is adjacent to and connected with the second surface 315,325 of the recess 313,323, but the disclosure is not limited thereto. In some other embodiments of the disclosure, a gap may be formed between the first surface 314,324 and the second surface 315,325.

Each of the two opposite sides of the third pivot member 330 has a shaft 331 and a protrusion 333 located on an outer wall surface 332 of the shaft 331. The two shafts 331 rotate on the two axial holes 311,321, respectively, and the two protrusions 333 are located on one of the plurality of recesses 313 of the first pivot member 310 and on the one of the plurality of recesses 323 of the second pivot member 320, respectively.

Figure 4:
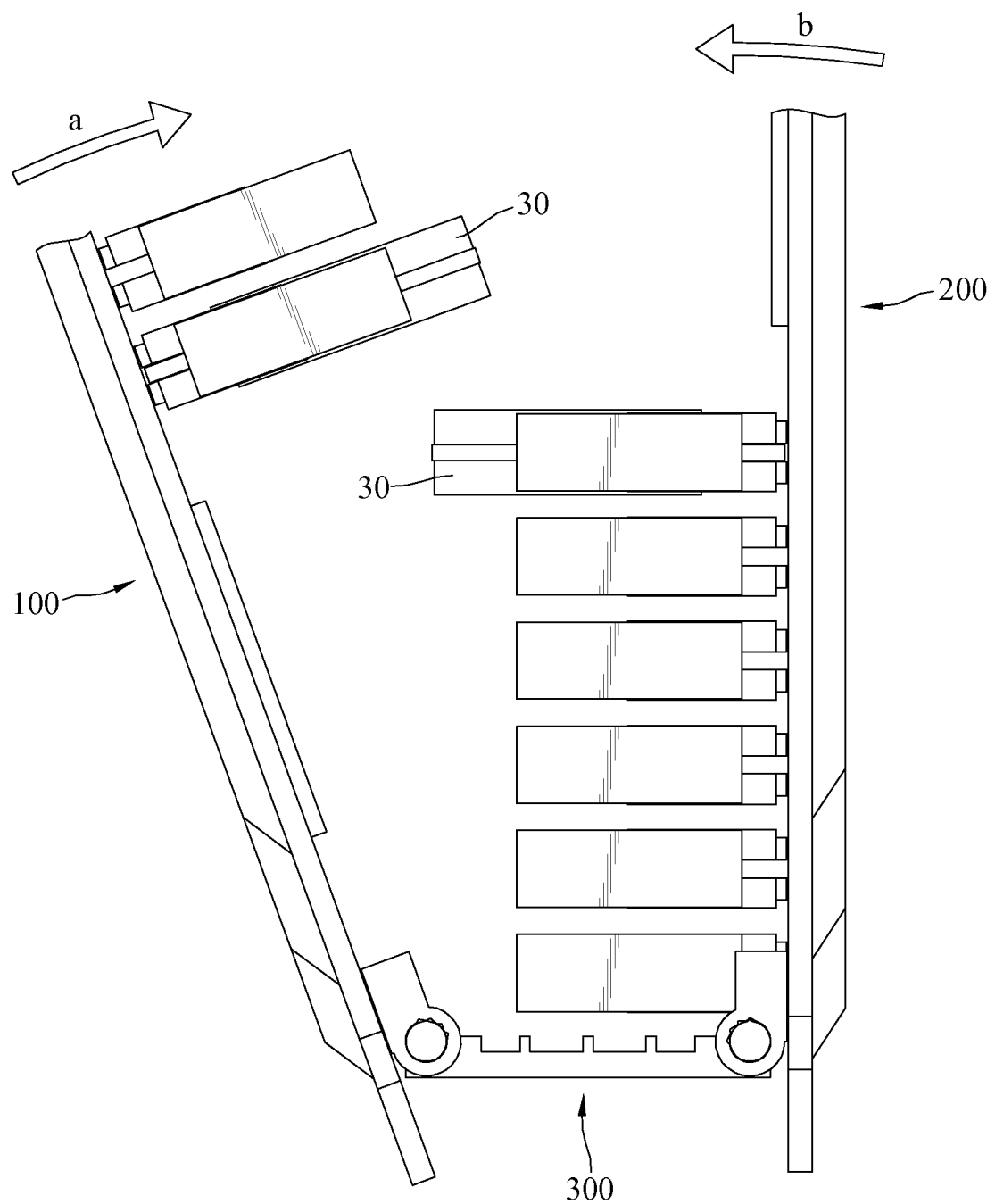
FIG. 4 is a schematic view of the foldable assembly at a closed position described in FIG. 1.
Figure 5:
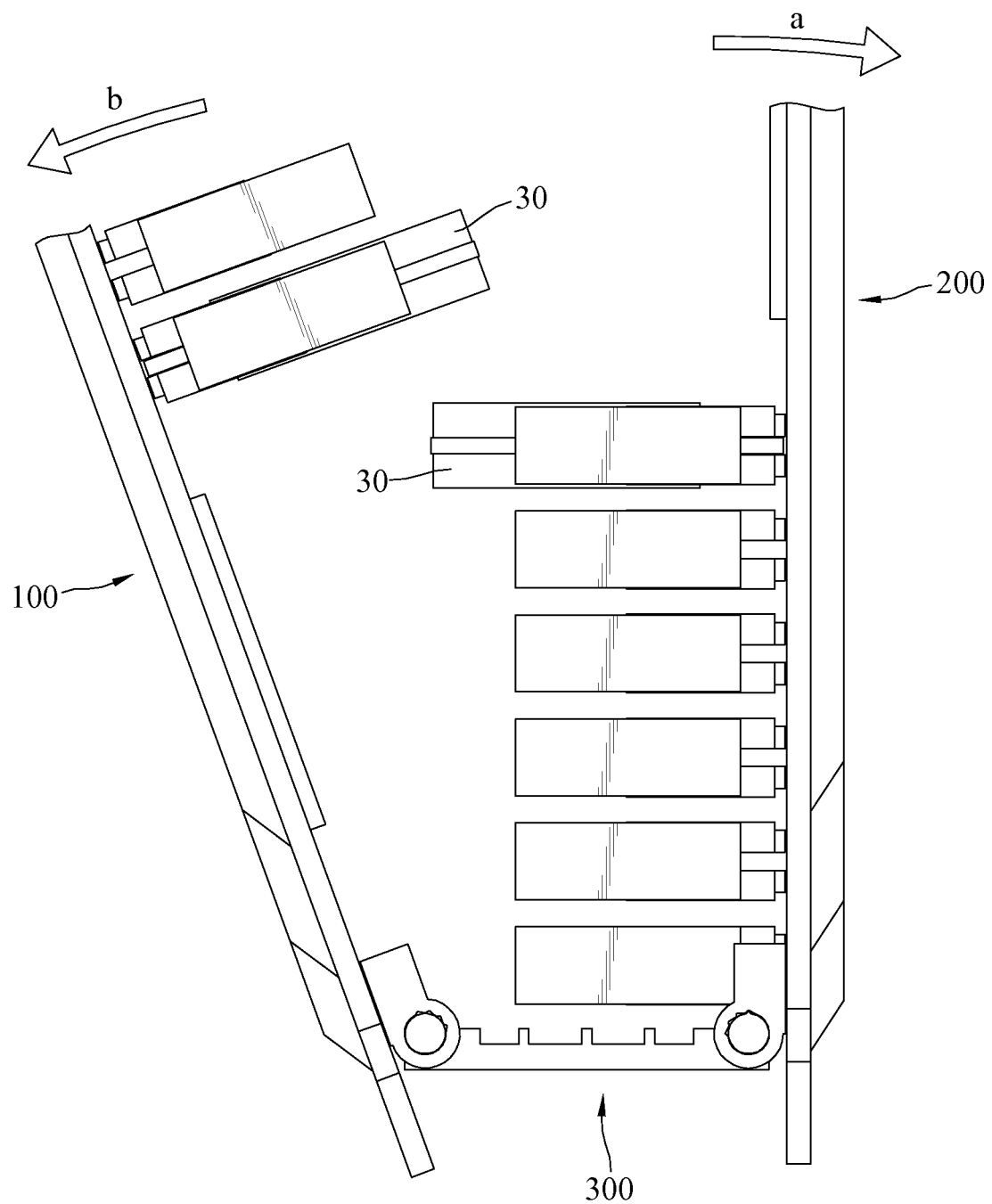
FIG. 5 is a schematic view of the foldable assembly at an open position described in FIG. 1.

The action principle between the pivot assembly 300 and the foldable assembly 10 is going to be introduced in the following paragraph. Please refer to the FIG. 4 and FIG. 5. FIG. 4 is a schematic view of the foldable assembly at a closed position described in FIG. 1. FIG. 5 is a schematic view of the foldable assembly at an open position described in FIG. 1.

Because both of the first angle $\theta_1$ and the second angle $\theta_2$ are smaller than 90 degrees, and the first angle $\theta_1$ is greater than the second angle $\theta_2$. Therefore, when the two shafts 331 rotate on the two axial holes 311,321, respectively, the rotational resistance in clockwise direction is greater than another rotational resistance in counterclockwise direction.

In this embodiment, when the first plate component 100 and the second plate component 200 are pivoted with each other by users and are located at a closed position, the first plate component 100 rotates along a clockwise direction (namely, toward an arrow of a) and has a larger rotational resistance. The second plate component 200 rotates along a counterclockwise direction (namely, toward the arrow of b) and has a smaller rotational resistance. Therefore, the second plate component 200 is pivoted to a closed position earlier than the first plate component 100 is pivoted to the closed position. (shown in FIG. 4.), which prevents interference between the memory modules 30 located between the first plate component 100 and the second plate component 200.

On the contrary, when the first plate component 100 and the second plate component 200 are pivoted with each other by users and are located at an open position, the first plate component 100 rotates along a counterclockwise direction (namely, toward an arrow of b) and has a smaller rotational resistance. The second plate component 200 rotates along a clockwise direction (namely, toward the arrow of a) and has a larger rotational resistance. Therefore, the first plate component 100 is moved from the closed position earlier than the second plate component 200 is moved from the closed position (shown in FIG. 5.), which prevents interference between the memory modules 30 located between the first plate component 100 and the second plate component 200.

Figure 6:
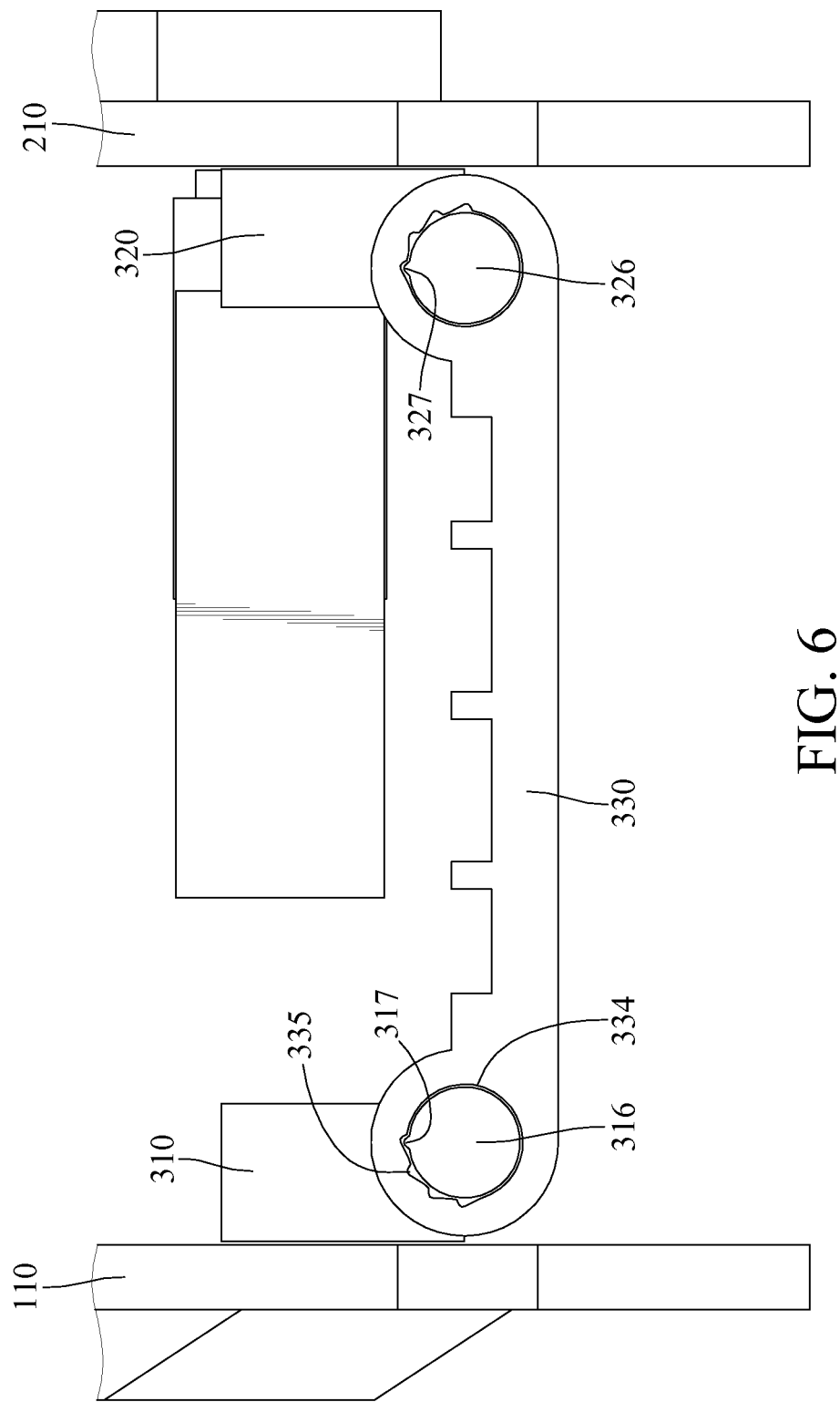
FIG. 6 is a plane view of the foldable assembly according to another embodiment of the disclosure.

Please refer to the FIG. 6, which is a plane view of the foldable assembly according to another embodiment of the disclosure. The configuration of this embodiment is similar to that of the embodiment described in FIG. 1, thus only the differences are illustrated in the following paragraph.

In this embodiment, the foldable assembly 10 comprises a first plate component 100, a second plate component 200 and a pivot assembly 300. The first pivot member 310 is connected with the first plate component 100, and the second pivot member 320 is connected with the second plate component 200. Each of the first pivot member 310 and the second pivot member 320 has a shaft 316, 326 and a protrusion 317,327. In this embodiment, the structure of the shaft 316, 326 is similar to the shaft 331 described in FIG. 3A, and that of the protrusion 317,327 is similar to the protrusion 333 described in FIG. 3A, thus the similar description is not repeated herein again.

The two opposite sides of the third pivot member 330 has an axial hole 334 and a recess 335. The structure of the axial hole 334 is similar to the axial hole 311,321 described in FIG. 3A, and that of the recess 335 is similar to the recess 313,323 described in FIG. 3A, thus the similar description is not repeated herein again.

The pivot assembly 300 mentioned above is adapted for the foldable assembly 10 with double pivot axes, but the disclosure is not limited thereto. In other words, the pivot assembly 300 is also adapted for the foldable assembly 10 with single pivot axis. In the following paragraph, the pivot assembly 300 with single pivot axis is going to be illustrated.

Figure 7:
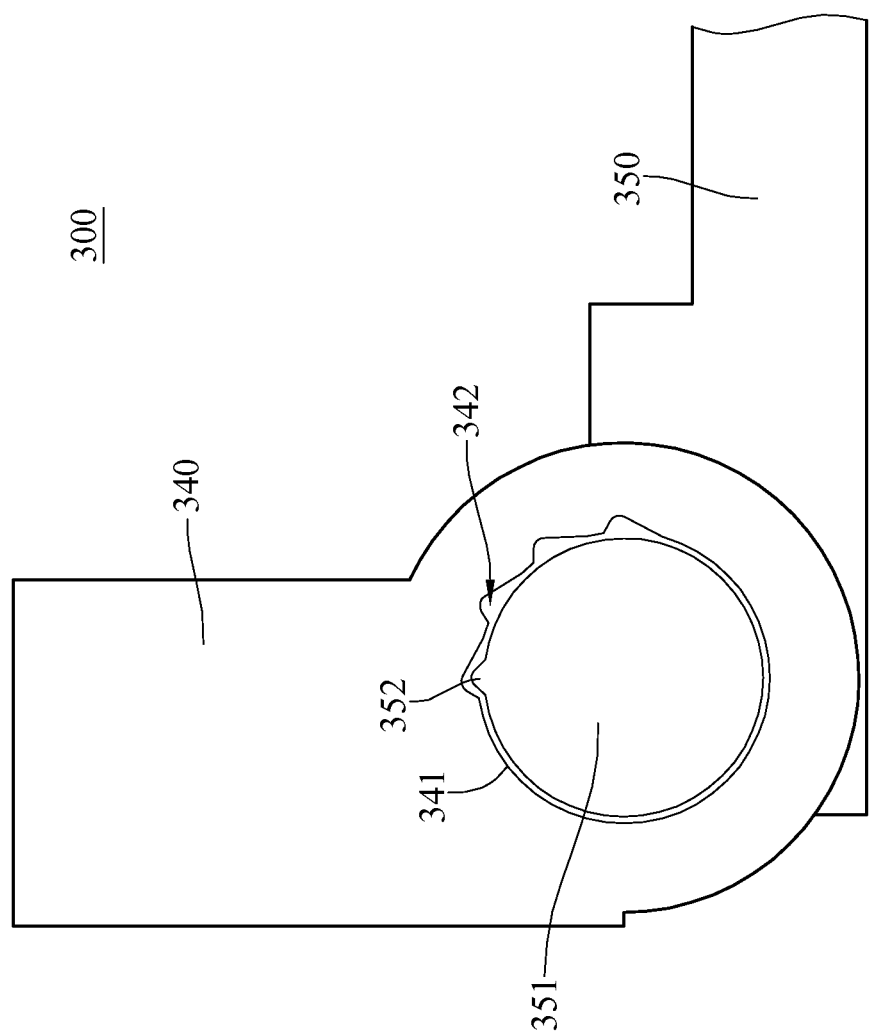
FIG. 7 is a plane view of a pivot assembly according to another embodiment of the disclosure.

Please refer to the FIG. 7, which is a plane view of a pivot assembly according to the other embodiment of the disclosure. In this embodiment of the disclosure, the pivot assembly 300 comprises a fourth pivot member 340 and a fifth pivot member 350. The fourth pivot member 340 has a shaft 341 and a protrusion 342. The structure of the shaft 341 is similar to the shaft 331 described in FIG. 3A, and the protrusion 342 is similar to the protrusion 333 described in FIG. 3A, thus the similar description is not repeated herein again.

In this embodiment of the disclosure, the fifth pivot member 350 has an axial hole 351 and a plurality of recesses 352. The structure of the axial hole 351 is similar to the axial hole 311, 321 described in FIG. 3A, and the recess 352 is similar to the recess 313, 323 described in FIG. 3A, thus the similar description is not repeated herein again.

According to the foldable assembly and the pivot assembly thereof of the disclosure, both of the first angle and the second angle are smaller than 90 degrees, and the first angle is greater than the second angle. Therefore, when the two shafts 331 rotate on the two axial holes 311, 321, respectively, the rotational resistance in clockwise direction is greater than that in counterclockwise direction, which further causes the difference of the pivotal speed between the first plate component and the second plate component, in order to prevent the memory modules located on the first plate component and on the second plate component from being interfered with each other.

What is claimed is:

1. A foldable assembly, comprising:
a first plate component;
a second plate component; and
a pivot assembly, comprising a first pivot member, a second pivot member and a third pivot member, wherein the first pivot member is connected with the first plate component, and the second pivot member is connected with the second plate component, wherein each of the first pivot member and the second pivot member has an axial hole and a plurality of recesses which are located on an inner wall surface of the axial hole, each of the plurality of recesses has a first surface and a second surface which is opposite to the first surface, wherein the angle between the first surface and the inner wall surface is different from that between the second surface and the inner wall surface, wherein each of the two opposite sides of the third pivot member has a shaft and a protrusion located on an outer wall surface of the shaft, the two shafts are adapted for being rotatable on the two axial holes, respectively, and the two protrusions are located on one of the plurality of recesses of the first pivot member and on the one of the plurality of recesses of the second pivot member, respectively.

2. The foldable assembly according to claim 1, wherein the first surface of the each of the plurality of recesses in the first pivot member has a first normal direction, and the axial hole has a plurality of first radial directions which are far from the axis of the axial hole, wherein the vector product generated by the first radial direction intersected with the first normal direction and the first normal direction is defined as a first direction, wherein the first surface of the each of the plurality of recesses in the second pivot member has a second normal direction, and the axial hole has a plurality of second radial directions which are far from the axis of the axial hole, wherein the vector product generated by the second radial direction intersected with the second normal direction and the second normal direction is defined as a second direction, wherein the first direction is equal to the second direction.

3. The foldable assembly according to claim 1, wherein the first plate component has a first printed circuit board, a first electrical connection part and at least one first expansion slot, the first printed circuit board is connected with the first pivot member, the first electrical connection part is electrically connected with the first printed circuit board and the at least one first expansion slot is electrically connected with the first printed circuit board, wherein the second plate component has a second printed circuit board, a second electrical connection part and at least one second expansion slot, the second printed circuit board is connected with the second pivot member, the second electrical connection part is electrically connected with the second printed circuit board and the at least one second expansion slot is electrically connected with the second printed circuit board, wherein the first electrical connection part and the second electrical connection part are coupled with two electrical slots.

4. The foldable assembly according to claim 3, wherein the first plate component and the second plate component are pivoted with each other, and have a closed position when the first plate component is drawn near the second plate component, wherein the at least one first expansion slot and the at least one second expansion slot are alternatively arranged with each other when the first plate component and the second plate component are located at the closed position.

5. The foldable assembly according to claim 1, wherein the first surface of the recess is adjacent to and connected with the second surface of the recess.

6. The foldable assembly according to claim 1, wherein a first angle is formed between the first surface of the recess and the inner wall surface, and a second angle is formed between the second surface of the recess and the inner wall surface, wherein both of the first angle and the second angle are smaller than 90 degrees, and the first angle is greater than the second angle.

7. The foldable assembly according to claim 1, wherein each first surface and each second surface of the recesses of the first pivot member and the second pivot member are alternatively located along a rotational direction.

8. A pivot assembly, comprising:
a fourth pivot member having a shaft and a protrusion, wherein the shaft has an outer wall surface and the protrusion is located on the outer wall surface; and
a fifth pivot member having an axial hole and a plurality of recesses located on an inner wall surface of the axial hole, wherein each of the plurality of recesses has a first surface and a second surface, the first surface and the second surface are alternatively arranged along a rotation direction where a rotation axis is based on the axis of the axial hole, wherein the angle between the first surface and the inner wall surface is different from that between the second surface and the inner wall surface, wherein each of the two opposite sides of the fourth pivot member has a shaft, the shafts are pivoted on the axial holes, respectively, and the protrusion is located on one of the plurality of recesses of the fifth pivot member.

9. The pivot assembly according to claim 8, wherein the first surface of the recess is adjacent to and connected with the second surface of the recess.

10. The pivot assembly according to claim 8, wherein a first angle is formed between the first surface of the recess and the inner wall surface, and a second angle is formed between the second surface of the recess and the inner wall surface, wherein both of the first angle and the second angle are smaller than 90 degrees, and the first angle is greater than the second angle.

* * * * *